US012510864B2

(12) United States Patent
Nagahama

(10) Patent No.: US 12,510,864 B2
(45) Date of Patent: Dec. 30, 2025

(54) REGULATOR, MOVEMENT, AND WATCH

(71) Applicant: SEIKO EPSON CORPORATION, Tokyo (JP)

(72) Inventor: Reiko Nagahama, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 471 days.

(21) Appl. No.: 18/070,045

(22) Filed: Nov. 28, 2022

(65) Prior Publication Data

US 2023/0168628 A1 Jun. 1, 2023

(30) Foreign Application Priority Data

Nov. 29, 2021 (JP) ................................ 2021-192656

(51) Int. Cl.
*G04B 18/02* (2006.01)
*G04B 17/06* (2006.01)
*G04B 17/32* (2006.01)

(52) U.S. Cl.
CPC ........... *G04B 18/026* (2013.01); *G04B 17/06* (2013.01); *G04B 17/325* (2013.01)

(58) Field of Classification Search
CPC .... G04B 18/026; G04B 17/32; G04B 17/325; G04B 17/34; G04B 17/06; G04B 17/066
See application file for complete search history.

(56) References Cited

U.S. PATENT DOCUMENTS 2,931,164 A * 4/1960 Schweizer ........... G04B 17/325 368/178
2007/0091729 A1 4/2007 Takahashi
2019/0064739 A1 * 2/2019 Christan ................ G04B 18/06
2020/0292992 A1 9/2020 Kaelin et al.

FOREIGN PATENT DOCUMENTS

JP 2007-114158 A 5/2007
JP 2018-189614 A 11/2018
JP 2019-525165 A 9/2019
JP 2020-034360 A 3/2020

* cited by examiner

*Primary Examiner* — Renee S Luebke
*Assistant Examiner* — Matthew Daniel Hwang
(74) *Attorney, Agent, or Firm* — Harness, Dickey & Pierce, P.L.C.

(57) ABSTRACT

A regulator of the present disclosure includes a regulator pin having a pair of leg portions in which a hairspring is loosely fitted in a gap between the pair of leg portions, a regulator body configured to hold the regulator pin, and a pin support having an attachment portion that is detachably attached to the regulator pin or the regulator body, and a receiving portion that prevents the hairspring from being detached from the pair of leg portions.

8 Claims, 10 Drawing Sheets

REGULATOR, MOVEMENT, AND WATCH

The present application is based on, and claims priority from JP Application Serial Number 2021-192656, filed Nov. 29, 2021, the disclosure of which is hereby incorporated by reference herein in its entirety.

BACKGROUND

1. Technical Field

The present disclosure relates to a regulator, a movement, and a watch.

2. Related Art

JP 2007-114158 A discloses a regulator having an eaves-shaped protrusion formed at a tip of each of a pair of leg portions in a regulator pin structure, that protrudes transversely along a side surface facing a gap between the leg portions.

In JP 2007-114158 A, according to the above-described characteristics, by rotating the regulator pin structure, it is possible to adjust a gap width for a hairspring, and to dispose the eaves-shaped protrusion at a position where the hairspring can be prevented from moving in a separation direction. As a result, it is possible to prevent the hairspring from being separated from the gap between the leg portions.

In JP 2007-114158 A, when the hairspring is removed from the regulator pin structure for maintenance, the regulator pin structure needs to be rotated to move the eaves-shaped protrusion at a position where the hairspring can be moved in the separation direction. Therefore, there has been a problem in that the gap width for the hairspring due to the regulator pin structure needs to be readjusted, when the hairspring is disposed again in the gap between the leg portions of the regulator pin structure after maintenance of the hairspring.

SUMMARY

A regulator of the present disclosure includes a regulator pin having a pair of leg portions in which a hairspring is loosely fitted in a gap between the pair of leg portions, a regulator body configured to hold the regulator pin, and a pin support having an attachment portion detachably attached to the regulator pin or the regulator body, and a receiving portion that prevents the hairspring from being detached from the pair of leg portions.

A movement of the present disclosure includes a spiral-formed hairspring, and a regulator having a regulator pin, a regulator body, and a pin support, wherein the regulator pin has a pair of leg portions in which the hairspring is loosely fitted in a gap between the pair of leg portions, the regulator body holds the regulator pin, the pin support has an attachment portion detachably attached to the regulator pin or the regulator body, and a receiving portion that prevents the hairspring from being detached from the pair of leg portions.

A watch of the present disclosure includes a movement having a spiral-formed hairspring, and a regulator having a regulator pin, a regulator body, and a pin support, wherein the regulator pin has a pair of leg portions in which the hairspring is loosely fitted in a gap between the pair of leg portions, the regulator body holds the regulator pin, and the pin support has an attachment portion detachably attached to the regulator pin, or the regulator body, and a receiving portion that prevents the hairspring from being detached from the pair of leg portions.

DESCRIPTION OF EXEMPLARY EMBODIMENTS

First Embodiment

A watch 1 according to a first embodiment of the present disclosure will be described below with reference to the figures.

Figure 1:
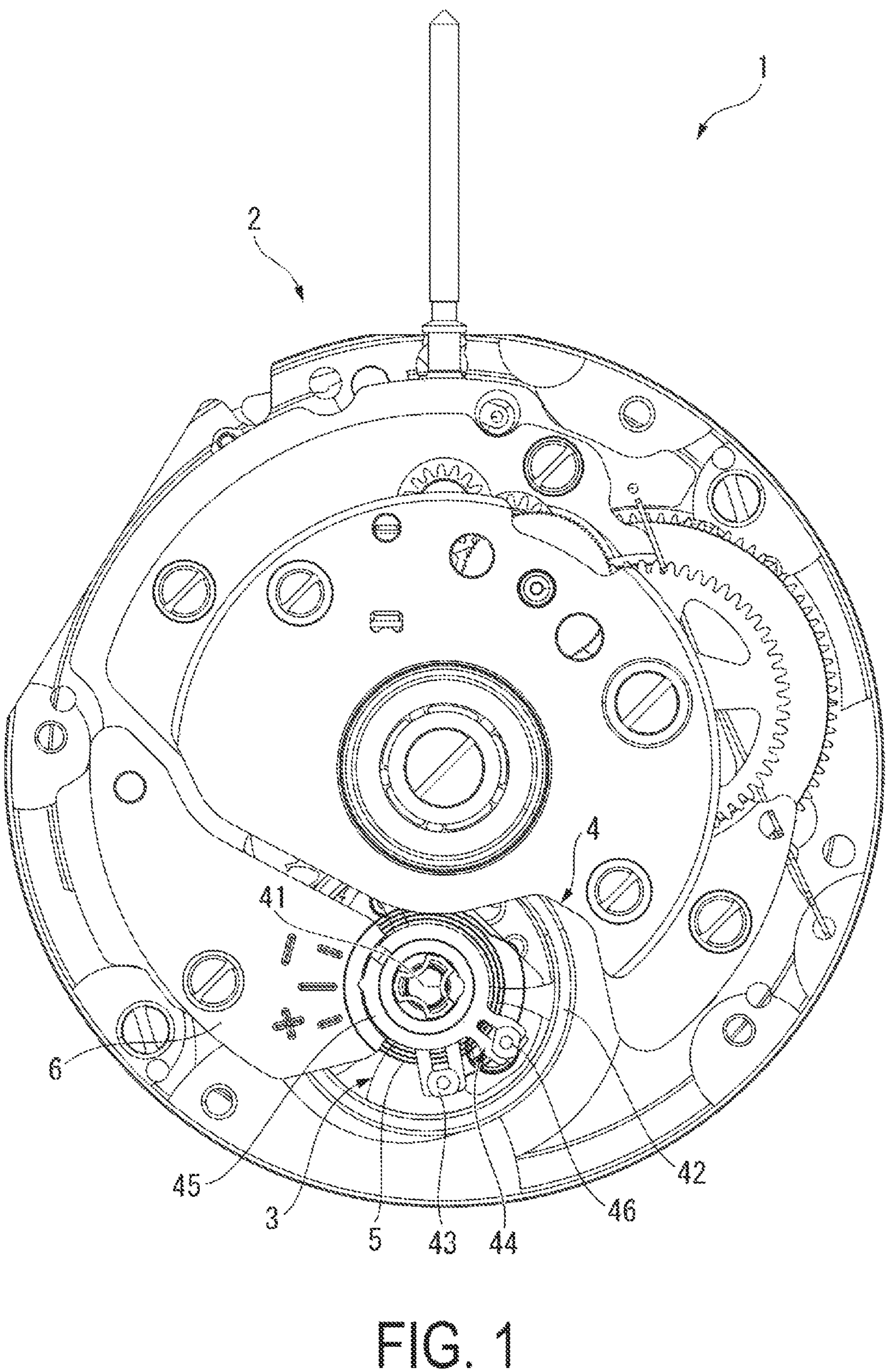
FIG. 1 is a plan view illustrating a main part of a movement of a watch of a first embodiment.

FIG. 1 is a plan view illustrating a main part of a movement 2 of the watch 1 of the present embodiment. Note that in FIG. 1, an outer case is omitted, and only the movement 2 in the watch 1 is illustrated.

As illustrated in FIG. 1, the watch 1 is a so-called mechanical watch, and has the movement 2. Then, in the present embodiment, the movement 2 has a speed governor 3.

Speed Governor

A speed governor 3 is a component that serves as a time reference for the watch 1, and includes a balance with hairspring 4 and a hairspring 5.

The balance with hairspring 4 is a component that performs reciprocating vibration at a constant period to control movement of a pallet fork (not illustrated), and is configured to include a balance staff 41, a balance wheel 42, a stud 43, a regulator 44, a roller table (not illustrated), a collet, and the like.

The balance staff 41 is rotatably supported by a balance bridge 6 and a main plate (not illustrated). Then, the balance wheel 42, the roller table, and the collet are fixed to the balance staff 41, and these components are configured to rotate integrally.

The stud 43 fixes an outer peripheral edge of the hairspring 5.

The regulator 44 includes a regulator pin 46 described below, and an outermost peripheral portion of the hairspring 5 is loosely fitted between a pair of leg portions 463 and 464 (FIG. 2) of the regulator pin 46 described below. Note that, details of the regulator 44 will be described below.

The hairspring 5 is formed in an Archimedes spiral, and an inner peripheral end thereof is fixed to the collet (not illustrated), and an outer peripheral end is fixed to the stud 43.

Then, in such a speed governor 3, when the balance wheel 42 rotates with the balance staff 41 as a shaft, the collet also rotates accordingly, thus biasing force of the hairspring 5 acts on the balance wheel 42, and when the biasing force and the inertial force of the balance wheel 42 are balanced, the rotation of the balance wheel 42 is stopped, and the balance wheel 42 rotates in a reverse direction due to the biasing force of the hairspring 5. That is, the balance wheel 42 repeatedly swings with the balance staff 41 as the shaft.

A swinging period of the balance wheel 42 can be changed by fine adjustment of a position of the regulator pin 46 of the regulator 44.

Regulator

Figure 2:
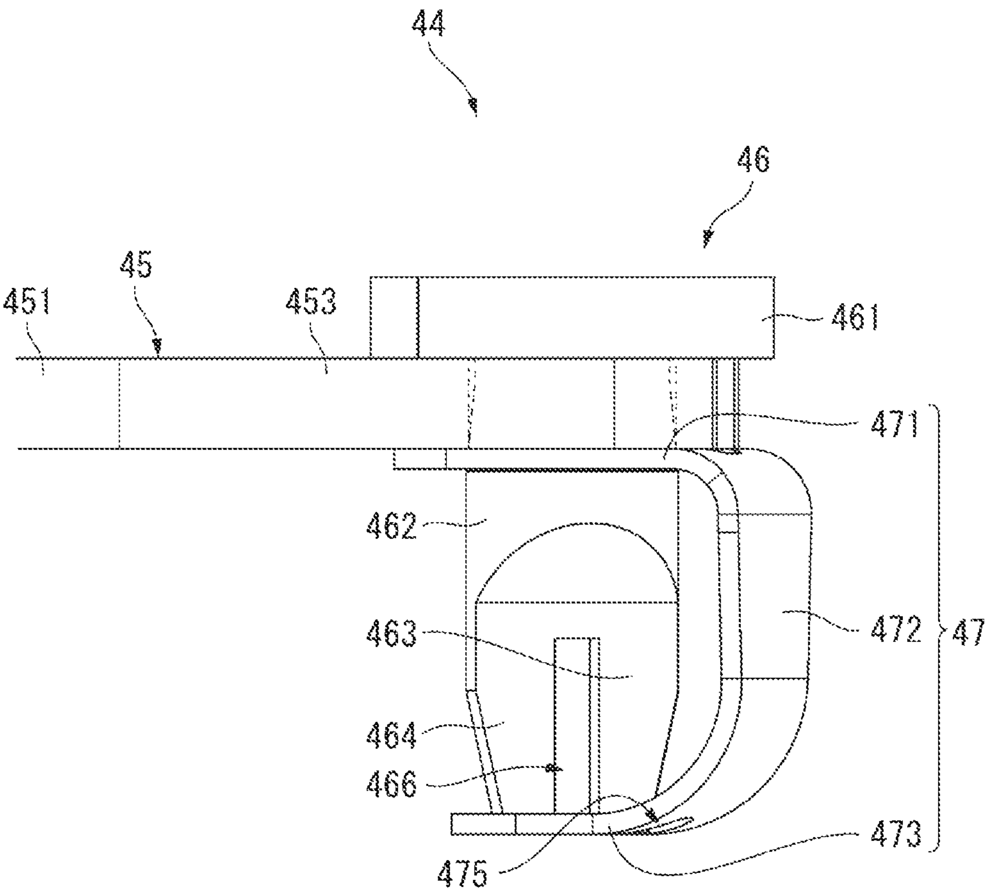
FIG. 2 is a side view illustrating a main part of a regulator of the first embodiment.
Figure 3:
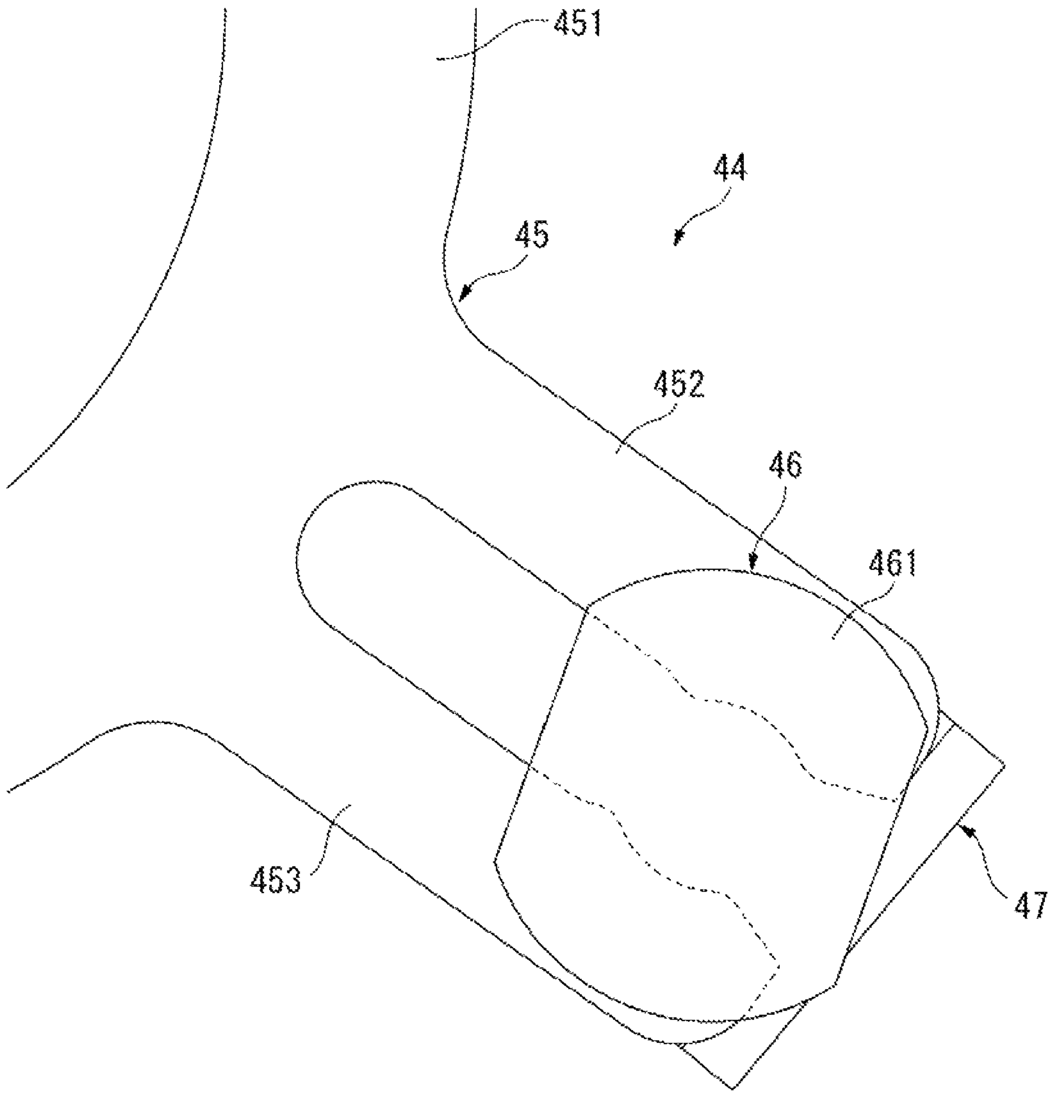
FIG. 3 is a plan view illustrating a main part of the regulator of the first embodiment.
Figure 4:
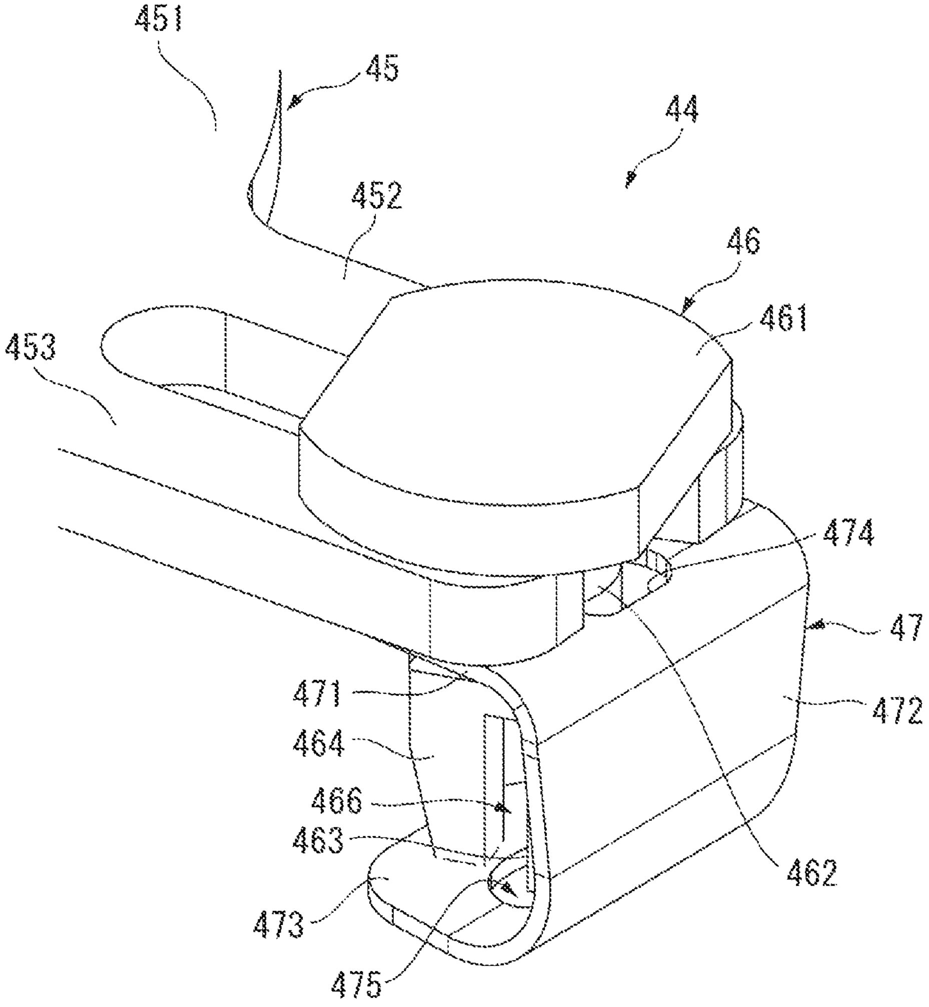
FIG. 4 is a perspective view illustrating a main part of the regulator of the first embodiment.

FIG. 2 is a side view illustrating a main part of the regulator 44, FIG. 3 is a plan view illustrating a main part of the regulator 44, and FIG. 4 is a perspective view illustrating a main part of the regulator 44.

As illustrated in FIG. 1 to FIG. 4, the regulator 44 is a component that adjusts the swinging period of the balance wheel 42 by adjusting a contact position between the hairspring 5 and the regulator pin 46 and adjusting an effective length of the hairspring 5, and includes a regulator body 45, the regulator pin 46, and a pin support 47. The effective length of the hairspring 5 is a length from an inner end of the hairspring 5 to a contact point with the regulator pin 46.

The regulator body 45 is a component that holds the regulator pin 46, and is formed of a material such as a precipitation hardening stainless steel, for example. In the present embodiment, the regulator body 45 has a main body 451, a first holding portion 452, and a second holding portion 453.

As illustrated in FIG. 1, the main body 451 is formed in a C shape in plan view. In other words, the main body 451 is formed in an annular shape with a part thereof missing.

The first holding portion 452 and the second holding portion 453 are extended parallel to each other from the main body 451, and an arc-shaped recessed portions are formed at respective opposing surfaces thereof. Then, a shaft portion 462 of the regulator pin 46 described below is inserted into the respective recessed portions of the first holding portion 452 and the second holding portion 453. That is, the first holding portion 452 and the second holding portion 453 rotatably support the shaft portion 462 of the regulator pin 46. As a result, the regulator body 45 is configured to be capable of holding the regulator pin 46.

The regulator pin 46 is a component that adjusts a gap width for the hairspring 5, and is formed of a non-magnetic member such as brass, for example. In the present embodiment, the regulator pin 46 has a head portion 461, the shaft portion 462, a first leg portion 463, and a second leg portion 464.

The head portion 461 is formed in a substantially elliptical shape configured with straight portions and arc portions in plan view. Then, the shaft portion 462 extends from the head portion 461, and the head portion 461 and the shaft portion 462 are integrally formed. Also, the head portion 461 rotates integrally with the shaft portion 462, and thus also functions as an operation unit for operating rotation of the shaft portion 462 when the gap width for the hairspring 5 is adjusted.

The shaft portion 462 is inserted between the first holding portion 452 and the second holding portion 453 of the regulator body 45 and is rotatably supported. Then, one end portion on a side close to the head portion 461 of the shaft portion 462 has a shape having a taper such that a diameter thereof decreases as the head portion 461 is approached. Also, another end portion of the shaft portion 462 is provided with a pair of the first leg portion 463 and the second leg portion 464. That is, in the present embodiment, the shaft portion 462 holds the first leg portion 463 and the second leg portion 464.

The first leg portion 463 and the second leg portion 464 are extended from the other end portion of the shaft portion 462 in a direction in which the shaft portion 462 extends. Then, the first leg portion 463 and the second leg portion 464 are parallel to each other and have the same length, and the outermost circumferential portion of the hairspring 5 is loosely fitted into a gap 466 between the first leg portion 463 and the second leg portion 464. In this way, when the head portion 461 is operated to rotate the shaft portion 462, the gap width is adjusted, a distance between the first leg portion 463 or the second leg portion 464 and the hairspring 5 is changed, and a contact time when the hairspring 5 vibrates is adjusted. Note that, the contact time indicates a time from contact of the hairspring 5 with the first leg portion 463 to separation therefrom, or a time from contact of the hairspring 5 with the second leg portion 464 to separation therefrom, when the hairspring 5 contracts based on the swinging period of the balance wheel 42. By reducing the gap width, a total amount of the contact time is increased, and when force for unwinding of the hairspring 5 changes, a rate is less likely to be affected.

Note that, in the present embodiment, the first leg portion 463 and the second leg portion 464 are integrally provided at the end portion of the shaft portion 462, but are not limited thereto, and may be configured to be attached to the end portion of the shaft portion 462, for example.

The pin support 47 is a component that restricts separation of the hairspring 5 from the gap 466 between the first leg portion 463 and the second leg portion 464, and is formed of, for example, a non-magnetic and elastic member such as a SUS304. In other words, in the present embodiment, the regulator pin 46 and the pin support 47 constituting the regulator 44 are formed of the non-magnetic member. As a result, a component of the regulator 44 that is in direct contact with the hairspring 5 is not magnetized, and thus accuracy can be prevented from deteriorating by magnetism.

In addition, in the present embodiment, the pin support 47 is formed by bending a plate member having a thickness of approximately 45 μm in a substantially C shape, and has an attachment portion 471, a coupling portion 472, and a receiving portion 473.

The attachment portion 471 is configured to be detachably attached to the regulator pin 46. Specifically, the attachment portion 471 has an attachment recessed portion 474 on a tip side. Then, the shaft portion 462 of the regulator pin 46 is press-fitted into the attachment recessed portion 474. Thus, the attachment portion 471 is configured to be detachably attached to the shaft portion 462 of the regulator pin 46. In other words, in the present embodiment, the regulator pin 46 is configured to be capable of supporting the pin support 47.

At this time, in the present embodiment, separation of the hairspring 5 is restricted according to a positional relationship between the regulator pin 46 and the pin support 47 in an extension direction of the regulator body 45. In other words, the pin support 47 is disposed in a positional relationship where the hairspring 5 is not separated from between the first leg portion 463 and the second leg portion 464 of the regulator pin 46. As a result, a positional relationship between the pin support 47 and the regulator pin 46 in the extension direction of the regulator body 45 is dependent on the pin support 47 and the regulator pin 46 only, and thus a positional relationship with other components need not be considered. As a result, design of the pin support 47 can be facilitated.

The coupling portion 472 has a flat plate shape, and is bent in a direction intersecting the attachment portion 471. Then, in the present embodiment, the coupling portion 472 is disposed on an outer side in a radial direction of the main body 451 than the first holding portion 452 and the second holding portion 453 of the regulator body 45.

The receiving portion 473 is configured to be capable of restricting separation of the hairspring 5 from the first leg portion 463 and the second leg portion 464 of the regulator pin 46. Specifically, the receiving portion 473 has a flat plate shape, and is bent in a direction intersecting the coupling portion 472. In this way, the receiving portion 473 is disposed at a position to close the gap 466 between the first leg portion 463 and the second leg portion 464 in side view viewed from a direction orthogonal to the regulator pin 46. That is, the receiving portion 473 is disposed on a tip side of the first leg portion 463 and the second leg portion 464. Thus, movement of the hairspring 5 in a direction in which the hairspring 5 comes off from the gap 466 between the first leg portion 463 and the second leg portion 464 is restricted by the receiving portion 473.

Here, in the present embodiment, since the pin support 47 is configured to be detachable from the regulator pin 46 by the attachment portion 471, when the regulator 44 is assembled, the receiving portion 473 can be disposed at a position to close the gap 466 between the first leg portion 463 and the second leg portion 464, without being interfered from the hairspring 5, by disposing the hairspring 5 in the gap 466 between the first leg portion 463 and the second leg portion 464 in advance, and then attaching the pin support 47 to the regulator pin 46.

In addition, conversely, when the hairspring 5 is removed, by removing the pin support 47 from the regulator pin 46 in advance, and then removing the hairspring 5 from the gap 466 between the first leg portion 463 and the second leg portion 464, the regulator 44 and the hairspring 5 can be removed without changing the gap width.

Additionally, in the present embodiment, as illustrated in FIG. 2, the second leg portion 464, the first leg portion 463, and the coupling portion 472 are disposed side by side in order from an inside, along the radial direction of the main body 451 of the regulator body 45. Then, an opening 475 is provided in the receiving portion 473 at a position corresponding to a tip of the first leg portion 463. In other words, the opening 475 is provided in the receiving portion 473 at the position corresponding to the tip of the first leg portion 463 located on an outer side in the radial direction of the main body 451 of the regulator body 45 than the second leg portion 464. As a result, since the pin support 47 is formed of the elastic member, and the opening 475 is provided at the position corresponding to the tip of the first leg portion 463 in the receiving portion 473, it is possible to suppress interference between the tip of the first leg portion 463 located at the position on the outer side in the radial direction of the main body 451, and the receiving portion 473, when the receiving portion 473 is disposed at the position to close the gap portion 466 between the first leg portion 463 and the second leg portion 464. In other words, in side view viewed from the direction orthogonal to the regulator pin 46, the receiving portion 473 can be disposed at a position overlapping the tip of the first leg portion 463. As a result, the pin support 47 is formed of the elastic member, and thus a tip of the second leg portion 464 located on an inner side in the radial direction and the receiving portion 473 can be brought into contact with each other. That is, the tip of the second leg portion 464 and the receiving portion 473 can be brought into contact with each other in a state where the receiving portion 473 formed of the elastic member is warped. Therefore, it is possible to prevent the hairspring 5 from coming off through a gap between the tip of the second leg portion 464 and the receiving portion 473. Furthermore, a tip of the receiving portion 473 can be prevented from coming into contact with the balance wheel 42 operating around the regulator 44 caused by the receiving portion 473 interfering with the first leg portion 463, and the tip of the receiving portion 473 moving in a direction away from the regulator pin 46.

Operations and Effects of First Embodiment

In such a present embodiment, the following advantageous effects can be produced.

In the present embodiment, since the pin support 47 having the receiving portion 473 that restricts movement of the hairspring 5 that is loosely fitted into the gap 466 between the first leg portion 463 and the second leg portion 464 of the regulator pin 46 is provided, it is possible to prevent the hairspring 5 from coming off from the gap 466.

Here, in the present embodiment, the pin support 47 has the attachment portion 471 detachably attached to the regulator pin 46, and thus, by removing the pin support 47 from the regulator pin 46, the hairspring 5 can be removed from the gap 466 between the first leg portion 463 and the second leg portion 464. This allows maintenance of the hairspring 5 without changing an angle of rotation of the regulator pin 46 with respect to the regulator body 45. As a result, it is not necessary to readjust the gap width for the hairspring 5 by the regulator pin 46 after the maintenance of the hairspring 5, and thus the maintenance of the hairspring 5 can be facilitated.

In the present embodiment, the receiving portion 473 is disposed at the position to close the gap 466 between the first leg portion 463 and the second leg portion 464, and thus movement of the hairspring 5 in the direction away from the gap 466 can be restricted by the receiving portion 473. Therefore, it is possible to prevent the hairspring 5 from coming off from the gap 466.

In the present embodiment, the attachment portion 471 is detachably attached to the shaft portion 462 of the regulator pin 46. As a result, a positional relationship between the pin support 47 and the regulator pin 46 in the extension direction of the regulator body 45 is dependent on the pin support 47 and the shaft portion 462 of the regulator pin 46 only, and thus a positional relationship with other components need not be considered. As a result, design of the pin support 47 can be facilitated.

In the present embodiment, the pin support 47 is formed of the elastic member. This makes it possible to bring the receiving portion 473 of the pin support 47 into contact with the tip of the first leg portion 463 and the second leg portion 464 of the regulator pin 46. Thus, the tip of the receiving portion 473 can be prevented from coming into contact with the balance wheel 42 operating around the regulator 44 caused by the receiving portion 473 interfering with the first leg portion 463, and the tip of the receiving portion 473 moving in the direction away from the regulator pin 46.

In the present embodiment, the regulator pin 46 has the shaft portion 462 that holds the first leg portion 463 and the second leg portion 464, and the shaft portion 462 is rotatably held by the regulator body 45. As a result, since the shaft portion 462 is held rotatably with respect to the regulator body 45, so that the regulator pin 46 can rotate the shaft portion 462 with respect to the regulator body 45 to adjust the gap width for the hairspring 5.

In the present embodiment, the receiving portion 473 is provided with the opening 475 at the position corresponding to the tip of the first leg portion 463. This allows the receiving portion 473 to be disposed at a position overlapping the first leg portion 463 located outside in the radial direction of the regulator body 45, in side view viewed from the direction orthogonal to the regulator pin 46. Therefore, the second leg portion 464 located inside and the receiver portion 473 can be brought into contact with each other, and thus the hairspring 5 can be prevented from coming off through a gap between the second leg portion 464 and the receiving portion 473.

Second Embodiment

Next, a regulator 44A of a watch of a second embodiment of the present disclosure will be described with reference to FIG. 5 to FIG. 7. Note that, in the second embodiment, the same or similar components as or to those of the first embodiment will be given the same reference numerals and detailed description will be omitted or simplified.

Figure 5:
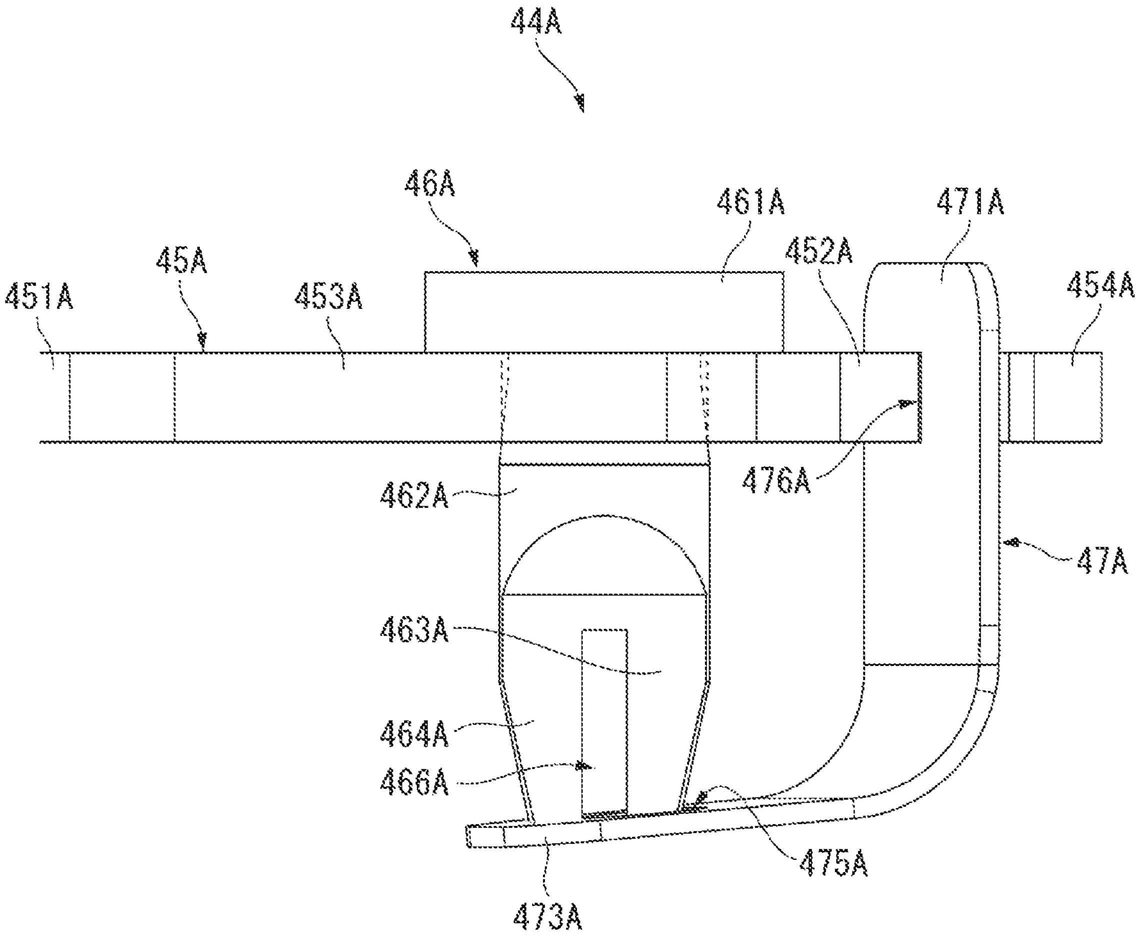
FIG. 5 is a side view illustrating a main part of a regulator of a second embodiment.
Figure 6:
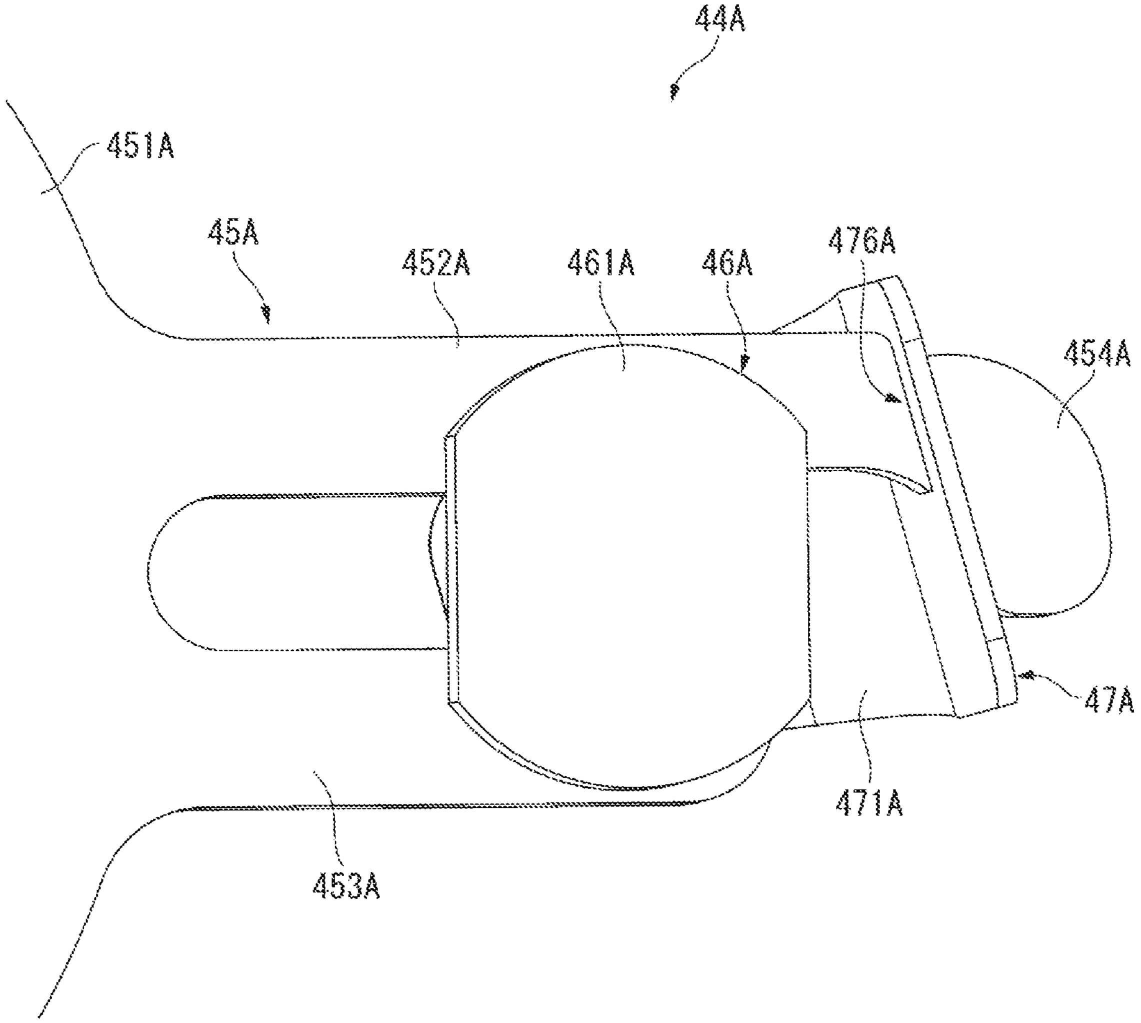
FIG. 6 is a plan view illustrating a main part of the regulator of the second embodiment.
Figure 7:
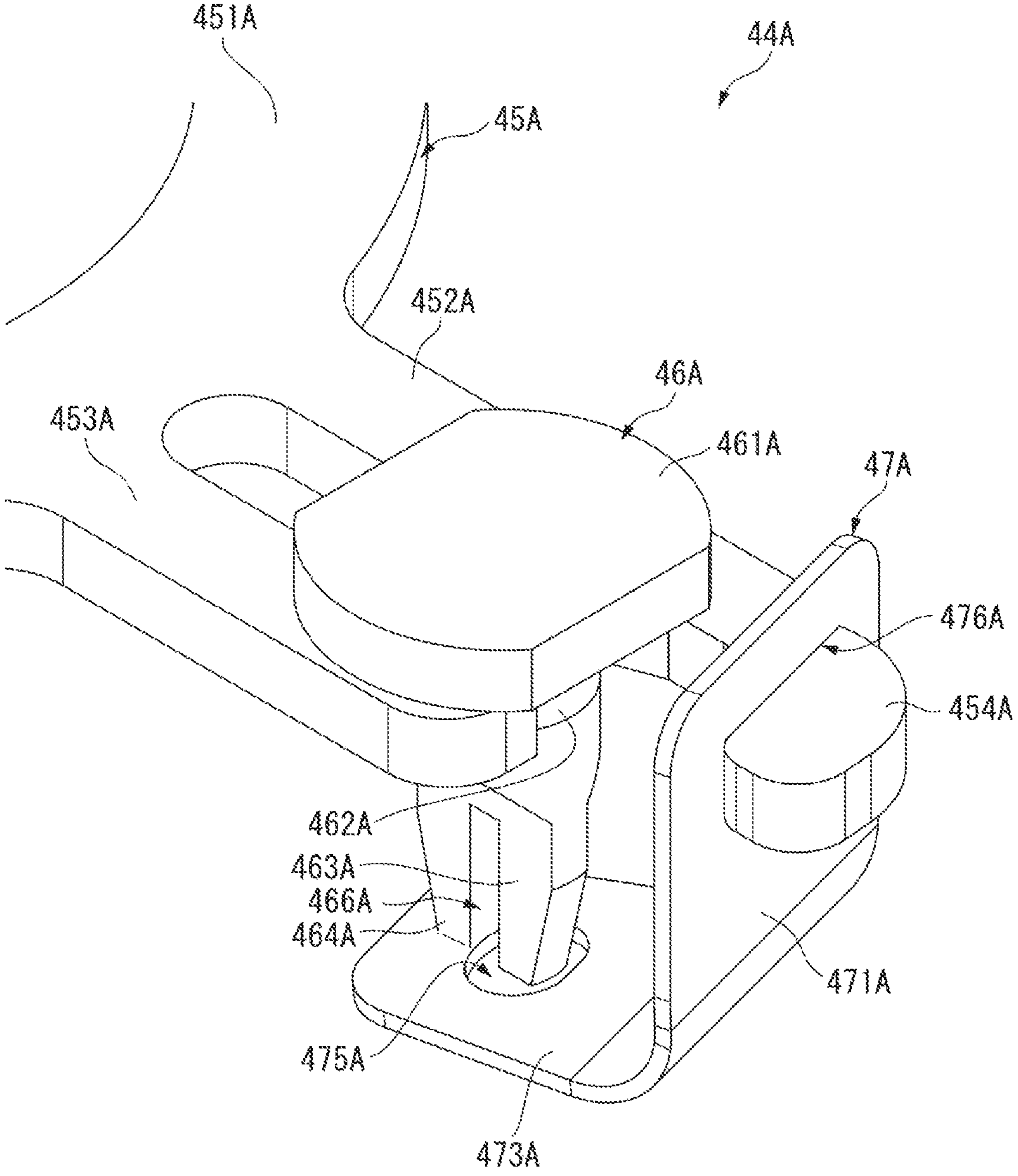
FIG. 7 is a perspective view illustrating a main part of the regulator of the second embodiment.

FIG. 5 is a side view illustrating a main part of the regulator 44A, FIG. 6 is a plan view illustrating a main part of the regulator 44A, and FIG. 7 is a perspective view illustrating a main part of the regulator 44A.

As illustrated in FIG. 5 to FIG. 7, the regulator 44A includes a regulator body 45A, a regulator pin 46A, and a pin support 47A, similarly to the regulator 44 of the first embodiment.

Similarly to the regulator body 45 of the first embodiment, the regulator body 45A is a component that holds the regulator pin 46A, and has a main body 451A, a first holding portion 452A, and a second holding portion 453A. Then, in the present embodiment, the regulator body 45A has a tip portion 454A extended from a tip of the first holding portion 452A in a direction intersecting the first holding portion 452A. That is, in the present embodiment, the first holding portion 452A and the tip portion 454A are substantially L-shaped in plan view viewed from a direction in which the regulator pin 46A extends.

In the regulator pin 46A, similarly to the regulator pin 46 of the first embodiment, a head portion 461A, a shaft portion 462A, a first leg portion 463A, and a second leg portion 464A are integrally formed. Also, the regulator pin 46A is configured such that the hairspring 5 is loosely fitted into a gap 466A between the first leg portion 463A and the second leg portion 464A. As a result, by rotating the regulator pin 46A with respect to the regulator body 45A, a gap width for the hairspring 5 can be adjusted.

The pin support 47A is a component that restricts separation of the hairspring 5 from the gap 466A between the first leg portion 463A and the second leg portion 464A, similarly to the pin support 47 of the first embodiment.

In the present embodiment, the pin support 47A is formed by bending a plate-shaped elastic member having a thickness of approximately 45 μm in a substantially L shape, and has an attachment portion 471A, and a receiving portion 473A. Then, in the present embodiment, the receiving portion 473A is provided with an opening 475A at a position corresponding to a tip of the first leg portion 463A of the regulator pin 46A, similarly to the first embodiment.

Here, in the present embodiment, an attachment portion 471A is configured to be detachably attached to the regulator body 45A. Specifically, a rectangular attachment hole 476A is provided in the attachment portion 471A. Then, first, the tip portion 454A is inserted into the attachment hole 476A in a state where the attachment portion 471A and the tip portion 454A of the regulator body 45A are disposed so as to be orthogonal to each other. Thereafter, the attachment portion 471A is rotated by 90°, and the first holding portion 452A of the regulator body 45A is inserted into the attachment hole 476A. Accordingly, the attachment portion 471A is configured to be detachably attached to the first holding portion 452A of the regulator body 45A. In other words, in the present embodiment, the regulator body 45A is configured to be capable of supporting the pin support 47A.

At this time, in the present embodiment, the attachment portion 471A is configured to be detachably attached to the regulator body 45A, rather than to the regulator pin 46A, and thus, it is possible to prevent the regulator pin 46A from being accidentally rotated, when the pin support 47A is attached to or detached from the regulator body 45A. As a result, it is possible to suppress a change in the gap width caused by rotating the pin support 47A.

Operations and Effects of Second Embodiment

In such a present embodiment, the following advantageous effects can be produced.

In the present embodiment, the attachment portion 471A is detachably attached to the regulator body 45A. As a result, since the pin support 47A is attached to the regulator body 45A, rather than to the regulator pin 46A, it is possible to suppress a change in the gap width caused by accidentally rotating the regulator pin 46A, when the pin support 47A is attached or detached.

Third Embodiment

Next, a regulator 44B of a watch of a third embodiment of the present disclosure will be described with reference to FIG. 8 to FIG. 10. Note that, in the third embodiment, the same or similar components as or to those of the first and second embodiments will be given the same reference numerals and detailed description will be omitted or simplified.

Figure 8:
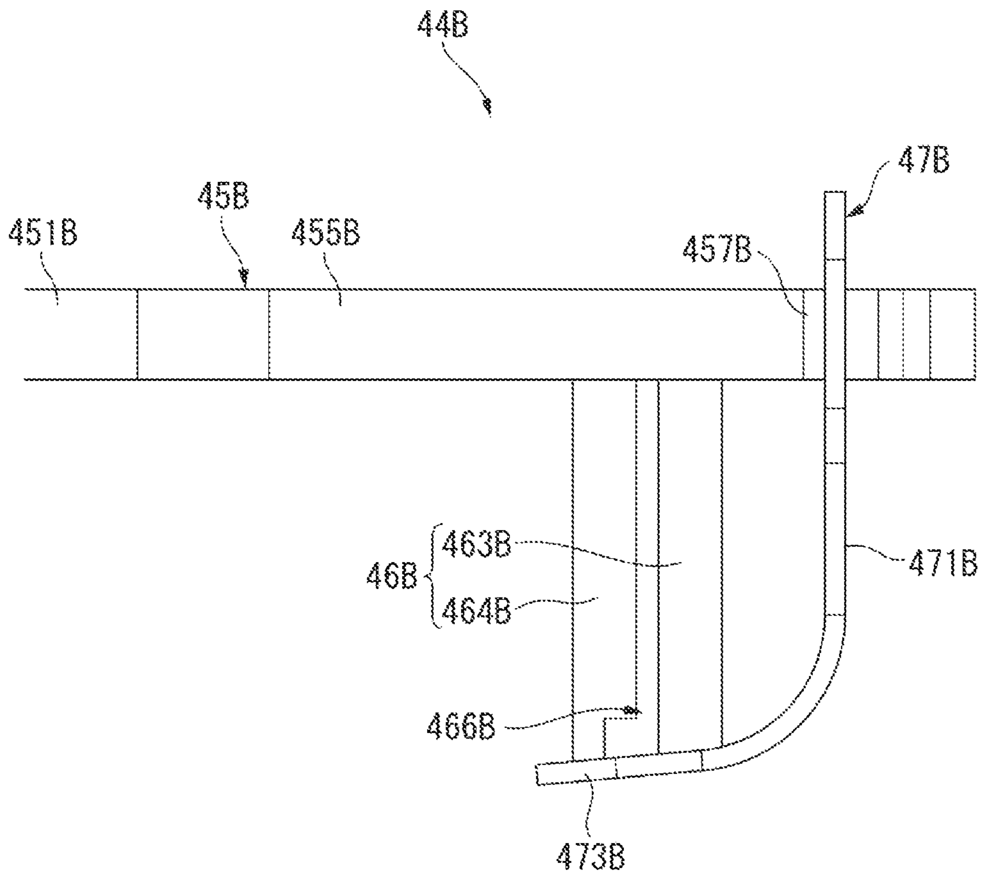
FIG. 8 is a side view illustrating a main part of a regulator of a third embodiment.
Figure 9:
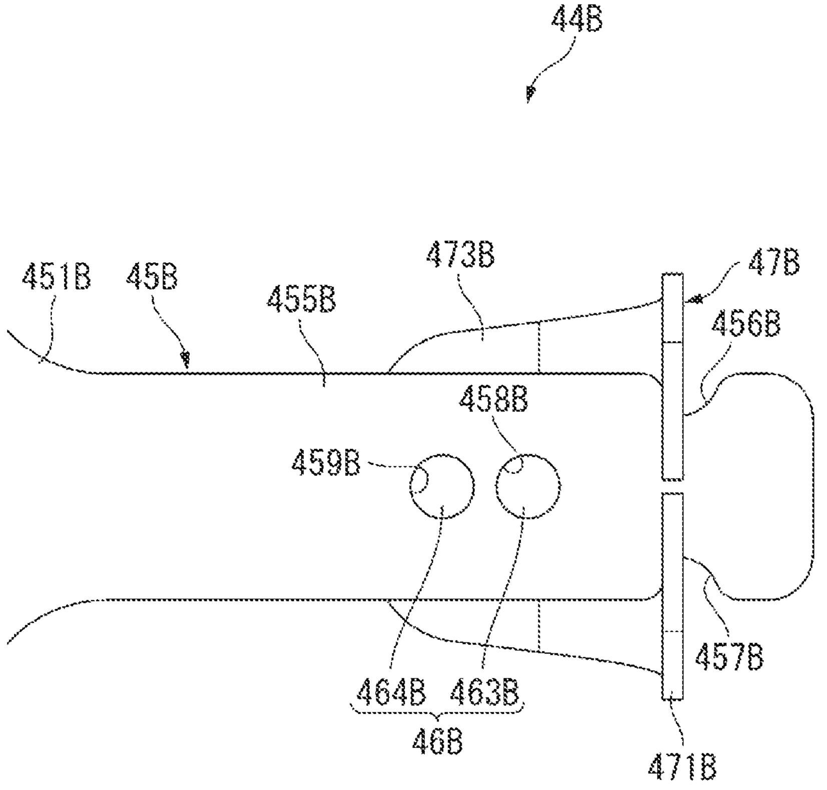
FIG. 9 is a plan view illustrating a main part of the regulator of the third embodiment.
Figure 10:
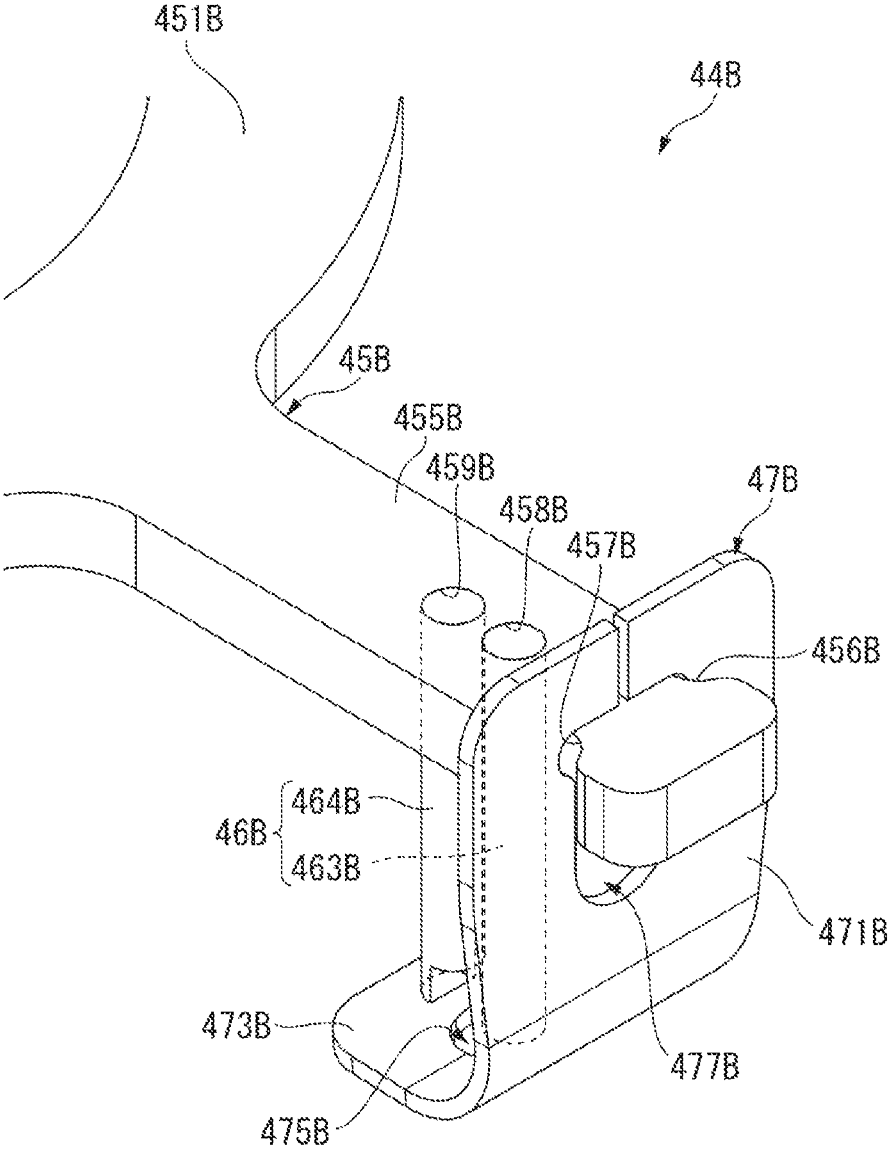
FIG. 10 is a perspective view illustrating a main part of the regulator of the third embodiment.

FIG. 8 is a side view illustrating a main part of the regulator 44B, FIG. 9 is a plan view illustrating a main part of the regulator 44B, and FIG. 10 is a perspective view illustrating a main part of the regulator 44B.

As illustrated in FIG. 8 to FIG. 10, the regulator 44B includes a regulator body 45B, a regulator pin 46B, and a pin support 47B, similarly to the regulator 44 of the first embodiment and the regulator 44A of the second embodiment.

Similarly to the regulator body 45 of the first embodiment and the regulator body 45A of the second embodiment, the regulator body 45B is a component that holds the regulator pin 46B, and has a main body 451B, and a holding portion 455B.

In the present embodiment, the holding portion 455B is extended from the main body 451B along a radial direction of the main body 451B. Then, the holding portion 455B is provided with a first recessed portion 456B, a second recessed portion 457B, a first insertion hole 458B, and a second insertion hole 459B.

The first recessed portion 456B and the second recessed portion 457B are provided so as to face each other in plan view viewed from a direction in which the regulator pin 46B extends. Specifically, the first recessed portion 456B and the second recessed portion 457B are each formed in a shape in which a part of the holding portion 455B is recessed at an end portion in a width direction orthogonal to a direction in which the holding portion 455B extends.

The first insertion hole 458B and the second insertion hole 459B are formed side by side in a radial direction in the regulator body 45B at a substantially central part of the holding portion 455B. Then, the first insertion hole 458B is formed in accordance with a diameter of the first leg portion 463B of the regulator pin 46B, and the second insertion hole 459B is formed in accordance with a diameter of the second leg portion 464B of the regulator pin 46B. That is, the first insertion hole 458B and the second insertion hole 459B are provided so as to allow the first leg portion 463B and the second leg portion 464B to be press-fitted, respectively.

The regulator pin 46B has the first leg portion 463B and the second leg portion 464B. That is, in the present embodiment, the first leg portion 463B and the second leg portion 464B are configured as separate members. Then, the first leg portion 463B is formed in a round bar shape, and is press-fitted into the first insertion hole 458B provided in the holding portion 455B of the regulator body 45B. Additionally, the second leg portion 464B is formed in a round bar shape in which a tip end side is cut into a semi-circle shape, and a base end side is press-fitted into the second insertion hole 459B provided in the holding portion 455B of the regulator body 45B. Accordingly, when the second leg portion 464B is rotated, and a distance between a side surface on a tip side of the second leg portion 464B and a side surface of the first leg portion 463B is changed, a gap width can be adjusted.

The pin support 47B is a component that restricts separation of the hairspring 5 from a gap 466B between the first leg portion 463B and the second leg portion 464B, similar to the pin support 47 of the first embodiment, and the pin support 47A of the second embodiment.

In the present embodiment, similarly to the pin support 47A of the second embodiment, the pin support 47B is formed by bending a plate-shaped elastic member having a thickness of approximately 45 μm in a substantially L shape, and includes an attachment portion 471B and a receiving portion 473B. Then, in the present embodiment, the receiving portion 473B is provided with an opening 475B at a position corresponding to a tip of the first leg portion 463B of the regulator pin 46B, similarly to the first and second embodiments.

Here, in the present embodiment, the attachment portion 471B is formed in a substantially C shape in which an end edge side is split by a slit, and is configured to be detachably attached to the regulator body 45B. Specifically, the attachment portion 471B is provided with a substantially T-shaped attachment elongated hole 477B in a central part. Then, in order to attach the pin support 47B to the holding portion 455B of the regulator body 45B, the pin support 47B is disposed so that a width direction of the holding portion 455B and a long axis of the attachment elongated hole 477B are orthogonal to each other. In this state, the holding portion 455B is pressed against and inserted through the attachment elongated hole 477B of the attachment portion 471B. As a result, the first recessed portion 456B and the second recessed portion 457B of the holding portion 455B and the attachment portion 471B engage with each other, and thus the pin support 47B is detachably attached to the holding portion 455B of the regulator body 45B. In other words, in the present embodiment, the regulator body 45B is configured to be capable of supporting the pin support 47B.

Further, as another method for attaching the pin support 47B to the holding portion 455B of the regulator body 45B, the pin support 47B is disposed so that the width direction of the holding portion 455B and the long axis of the attachment elongated hole 477B are parallel to each other. That is, from the state illustrated in FIG. 10, the pin support 47B is rotated by 90°, with a direction in which the holding portion 455B is extended as a rotational axis. In this state, the holding portion 455B is inserted through the attachment elongated hole 477B of the attachment portion 471B. Next, after inserting the holding portion 455B into the attachment elongated hole 477B of the attachment portion 471 until the pin support 47B moves to a position corresponding to the first recessed portion 456B and the second recessed portion 457B of the holding portion 455B, the pin support 47B is rotated by 90° in a direction opposite to the above.

Operations and Effects of Third Embodiment

In such a present embodiment, the following advantageous effects can be produced.

In the present embodiment, the attachment portion 471B is detachably attached to the regulator body 45B. As a result, since the pin support 47B is attached to the regulator body 45B, rather than to the regulator pin 46B, it is possible to suppress a change in the gap width caused by accidentally rotating the regulator pin 46B, when the pin support 47B is attached or detached.

Modified Example

Note that, the present disclosure is not limited to each of the above-described embodiments, and modifications, improvements, and the like within the scope in which the object of the present disclosure can be achieved are included in the present disclosure.

In the above-described embodiments, the receiving portion 473 is disposed at the position to close the gap 466 between the first leg portion 463 and the second leg portion 464, the receiving portion 473A is disposed at the position to close the gap 466A between the first leg portion 463A and the second leg portion 464A, and the receiving portion 473B is disposed at the position to close the gap 466B between the first leg portion 463B and the second leg portion 464B, but the present disclosure is not limited thereto. For example, a receiving portion may be disposed so as to be shifted in a circumferential direction of an outermost peripheral part of a hairspring, from a position corresponding to a gap between a first leg portion and a second leg portion. With such a configuration, even when the hairspring is going to move to a position where the hairspring comes off from the gap between the pair of leg portions along a direction in which a regulator pin extends, the outermost peripheral portion of the hairspring and a receiving portion interfere with each other and the movement of the hairspring is restricted, and thus coming off of the hairspring from the gap between the pair of leg portions can be suppressed.

In the embodiments described above, the pin supports 47, 47A, and 47B are each formed of the elastic member, but are not limited thereto. For example, a pin support may be formed of a member that does not have elasticity.

In the embodiments described above, the openings 475, 475A, and 475B are formed in the receiving portions 473, 473A, and 473B, respectively, but are not limited thereto.

For example, a recessed portion may be formed in a receiving portion at a position corresponding to a tip of a leg portion located on an outer side. This configuration makes it possible to suppress interference between the leg portion located on the outer side and a receiving portion. Also, a case where an opening or a recessed portion is not formed in a receiving portion is included in the present disclosure.

In the embodiments described above, the regulator pins 46, 46A, and 46B, and the pin supports 47, 47A, and 47B are each formed of the non-magnetic member, but are not limited thereto. For example, a case where either one of, or both of, a regulator pin and a pin support are each formed of a magnetic member is also included in the present disclosure.

In the embodiments described above, the pin supports 47, 47A, and 47B are each formed of the plate member having the thickness of approximately 45 μm, but are not limited thereto. A thickness of a pin support is not particularly limited, and it is sufficient that the pin support is detachably attached to a regulator pin or a regulator body, and configured so as to be able to restrict movement of a hairspring in a direction in which the hairspring comes off from a gap between a pair of leg portions.

In the third embodiment described above, the second leg portion 464B is formed in the round bar shape in which the tip side is cut into the semi-circle shape, but is not limited thereto. For example, a second leg portion may be formed in a round bar shape similarly to the first leg portion.

Summary of Present Disclosure

A regulator of the present disclosure includes a regulator pin having a pair of leg portions in which a hairspring is loosely fitted in a gap, a regulator body configured to hold the regulator pin, and a pin support having an attachment portion detachably attached to the regulator pin, or the regulator body, and a receiving portion that restricts separation of the hairspring from the pair of leg portions.

In the present embodiment, since the pin support having the receiving portion that restricts movement of the hairspring that is loosely fitted into the gap between the pair of leg portions of the regulator pin, it is possible to prevent the hairspring from coming off from the gap between the pair of leg portions.

Here, in the present disclosure, the pin support has the attachment portion detachably attached to the regulator pin, or the regulator body, and thus, by removing the pin support from the regulator pin, or the regulator body, the hairspring can be removed from the gap between the pair of leg portions. This allows maintenance of the hairspring without changing an angle of rotation of the regulator pin with respect to the regulator body. As a result, it is not necessary to readjust a gap width for the hairspring by the regulator pin after the maintenance of the hairspring, and thus the maintenance of the hairspring can be facilitated.

In the regulator of the present disclosure, the receiving portion may be disposed at a position to close the gap between the pair of leg portions, in side view when viewed from a direction orthogonal to the regulator pin.

As a result, the receiving portion is disposed at the position to close the gap between the pair of leg portions, and thus movement in a direction in which the hairspring comes off from the gap between the pair of leg portions can be restricted by the receiving portion. Therefore, it is possible to prevent the hairspring 5 from coming off from the gap between the pair of leg portions.

In the regulator of the present disclosure, the attachment portion may be detachably attached to the regulator pin.

As a result, a positional relationship between the pin support and the regulator pin in the extension direction of the regulator body is dependent on the pin support and the regulator pin only, and thus a positional relationship with other components need not be considered. As a result, design of the pin support can be facilitated.

In the regulator of the present disclosure, the attachment portion may be detachably attached to the regulator body.

As a result, since the pin support is attached to the regulator body, rather than to the regulator pin, it is possible to suppress a change in a gap width caused by accidentally rotating the regulator pin, when the pin support is attached or detached.

In the regulator of the present disclosure, a pin support may be formed of an elastic member.

This makes it possible to bring a pin support into contact with a tip of a pair of leg portions of a regulator pin, and thus, it is possible to prevent a hairspring from coming off from a gap between the pair of leg portions.

In the regulator of the present disclosure, the regulator pin may have a shaft portion that holds the pair of leg portions, and the shaft portion may be rotatably held by the regulator body.

As a result, since the shaft portion is held rotatably with respect to the regulator body, so that the regulator pin can rotate the shaft portion with respect to the regulator body to adjust a gap width for a hairspring.

In the regulator of the present disclosure, the receiving portion may be provided with an opening at a position corresponding to a tip of one leg portion of the pair of leg portions.

In this way, for example, by providing an opening at a position corresponding to a leg portion located on an outer side of a pair of leg portions, a receiving portion can be disposed at a position overlapping the leg portion located on the outer side, in side view viewed from a direction orthogonal to a regulator pin. Therefore, a leg portion located inside and the receiver portion can be brought into contact with each other, and thus a hairspring can be prevented from coming off through a gap between the leg portion located inside and the receiving portion.

A movement of the present disclosure includes a spiral-formed hairspring, and a regulator having a regulator pin, a regulator body, and a pin support, wherein the regulator pin has a pair of leg portions in which the hairspring is loosely fitted in a gap, the regulator body holds the regulator pin, the pin support has an attachment portion detachably attached to the regulator pin, or the regulator body, and a receiving portion that restricts separation of the hairspring from the pair of leg portions.

In the present embodiment, since the pin support having the receiving portion that restricts movement of the hairspring that is loosely fitted into the gap between the pair of leg portions of the regulator pin, it is possible to prevent the hairspring from coming off from the gap between the pair of leg portions.

Here, in the present disclosure, the pin support has the attachment portion detachably attached to the regulator pin, or the regulator body, and thus, by removing the pin support from the regulator pin, or the regulator body, the hairspring can be removed from the gap between the pair of leg portions. This allows maintenance of the hairspring without changing an angle of rotation of the regulator pin with respect to the regulator body. As a result, it is not necessary to readjust a gap width for the hairspring by the regulator pin after the maintenance of the hairspring, and thus the maintenance of the hairspring can be facilitated.

A watch of the present disclosure includes a movement having a spiral-formed hairspring, and a regulator having a regulator pin, a regulator body, and a pin support, wherein the regulator pin has a pair of leg portions in which the hairspring is loosely fitted in a gap, the regulator body holds the regulator pin, and the pin support has an attachment portion detachably attached to the regulator pin, or the regulator body, and a receiving portion that restricts separation of the hairspring from the pair of leg portions.

In the present embodiment, since the pin support having the receiving portion that restricts movement of the hairspring that is loosely fitted into the gap between the pair of leg portions of the regulator pin, it is possible to prevent the hairspring from coming off from the gap between the pair of leg portions.

Here, in the present disclosure, the pin support has the attachment portion detachably attached to the regulator pin, or the regulator body, and thus, by removing the pin support from the regulator pin, or the regulator body, the hairspring can be removed from the gap between the pair of leg portions. This allows maintenance of the hairspring without changing an angle of rotation of the regulator pin with respect to the regulator body. As a result, it is not necessary to readjust a gap width for the hairspring by the regulator pin after the maintenance of the hairspring, and thus the maintenance of the hairspring can be facilitated.

What is claimed is:

1. A regulator, comprising:

a regulator pin including a pair of leg portions in which a hairspring is movably fitted in a gap between the pair of leg portions;

a regulator body configured to hold the regulator pin; and a pin support including an attachment portion that is detachably attached to the regulator pin or the regulator body, and a receiving portion that prevents the hairspring from being detached from the pair of leg portions, wherein the receiving portion is disposed at a position where the gap between the pair of leg portions is obscured by the receiving portion, and the receiving portion is perpendicular to a plane of the gap and is separated from the pair of leg portions.

2. The regulator according to claim 1, wherein the attachment portion is detachably attached to the regulator pin.

3. The regulator according to claim 1, wherein the attachment portion is detachably attached to the regulator body.

4. The regulator according to claim 1, wherein the pin support includes an elastic member.

5. The regulator according to claim 1, wherein the regulator pin includes a shaft portion holding the pair of leg portions, and the shaft portion is rotatably held by the regulator body.

6. The regulator according to claim 1, wherein the receiving portion is provided with an opening at a position corresponding to a tip of one leg portion of the pair of leg portions.

7. A movement, comprising:

a hairspring formed in a spiral shape; and a regulator including a regulator pin, a regulator body, and a pin support, wherein the regulator pin includes a pair of leg portions in which the hairspring is movably fitted in a gap between the pair of leg portions, the regulator body holds the regulator pin, the pin support includes an attachment portion that is detachably attached to the regulator pin or the regulator body, and a receiving portion, the receiving portion abutting bottom edges of the pair of leg portions, and the receiving portion is disposed at a position where the gap between the pair of leg portions is obscured by the receiving portion, and the receiving portion is perpendicular to a plane of the gap and is separated from the pair of leg portions.

8. A watch, comprising a movement including a hairspring and a regulator, the hairspring being formed in a spiral shape, the regulator including a regulator pin, a regulator body, and a pin support, wherein the regulator pin includes a pair of leg portions in which the hairspring is movably fitted in a gap between the pair of leg portions, the regulator body holds the regulator pin, the pin support includes an attachment portion that is detachably attached to the regulator pin or the regulator body, and a receiving portion, the receiving portion abutting bottom edges of the pair of leg portions, and the receiving portion is disposed at a position where the gap between the pair of leg portions is obscured by the receiving portion, and the receiving portion is perpendicular to a plane of the gap and is separated from the pair of leg portions.

* * * * *